Figure 1:
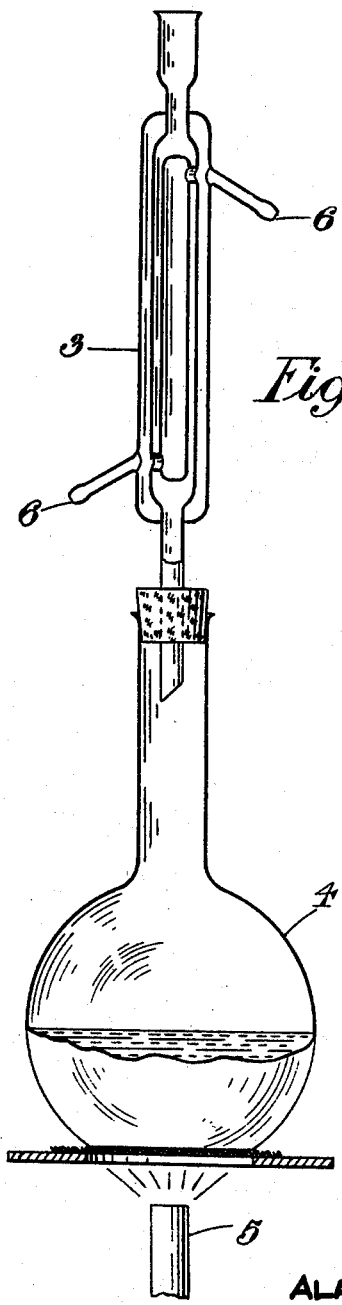

Sept. 26, 1950     A. T. B. P. SQUIRES     2,523,732
COMPOSITION OF MATTER AND PROCESSES
FOR ITS PREPARATION Filed March 27, 1950                        2 Sheets-Sheet 1

INVENTOR
ALAN T. B. P. SQUIRES by Wilkinson & Mawhinney
Attys.

Sept. 26, 1950     A. T. B. P. SQUIRES     2,523,732
COMPOSITION OF MATTER AND PROCESSES
FOR ITS PREPARATION Filed March 27, 1950     2 Sheets-Sheet 2

INVENTOR
ALAN T. B. P. SQUIRES
by Wilkinson Mawhinney
Attys.

Patented Sept. 26, 1950

2,523,732

UNITED STATES PATENT OFFICE 2,523,732

COMPOSITION OF MATTER AND PROCESSES FOR ITS PREPARATION

Alan Thomas Barrington Parkhurst Squires, Allenton, England, assignor to Rolls-Royce Limited, Derby, England, a British company Original application August 24, 1946, Serial No. 692,898. Divided and this application March 27, 1950, Serial No. 152,067. In Great Britain August 30, 1945

4 Claims. (Cl. 106—249)

This application is a division of my prior co-pending application filed August 24, 1946, Serial No. 692,898.

This invention concerns production of a new composition of matter.

The invention relates to a composition which is referred to as "a jointing substance." The main application of such a substance is for the purpose of jointing or sealing co-operating surfaces, as, for example, in internal combustion engines. Jointing substances to which the invention relates, may be prepared to have a low viscosity to permit application of the solution to the surface to be treated, and after the evaporation of solvents which they contain, leave a base medium which has a high degree of tackiness. The properties of low viscosity for application and tackiness after application are very desirable in jointing substances.

According to the invention, a process for the preparation of a jointing substance comprises the addition of sulphur to a fatty oil, heating the mixture at a temperature in excess of 220° C. so as to produce a vulcanized base, and dissolving said base in an organic solvent of a volatile nature to form a solution or dispersion which is in a flowable form to the surface to be treated, evaporation of said solvent producing a base medium of a tacky nature.

Preferably the fatty oil is castor oil or cod liver oil, the temperature to which the mixture is heated is 226° C. and the organic solvent contains toluene, xylene or solvent naphtha. Other fatty oils such as linseed, cottonseed or rape oil may be used however.

The use of the jointing substance in internal combustion engines offers particular advantages since the jointing medium remains plastic and pliable when exposed for long periods to temperatures up to the melting point of the composition and since moreover the base is resistant to the action of lubricating oils and fuels. Such a jointing substance may be used without the use of a joint washer.

In carrying the invention into practical effect the jointing substance is prepared by adding 20 parts by weight of sublimated sulphur (flowers of sulphur) to 100 parts by weight of castor oil, the mixture so produced being carefully heated, with continuous stirring, to 220° C. at which temperature a reaction takes place accompanied by considerable frothing of the mixture. Whilst this reaction is in progress the temperature of the mixture is allowed to rise to 226° C. and it is maintained at this temperature with continuous stirring for a period of 2 to 5 minutes. It is preferable not to heat the mixture for much longer periods than 5 minutes at this stage.

The mixture is then allowed to cool and throughout this stage of the process it is being continuously stirred until the temperature falls to approximately 200° C. The mixture is then poured into shallow tinned iron trays and allowed to cool to room temperature, the final product being a translucent reddish-brown rubber like elastic mass.

The vulcanized base thus obtained may be brought into a suitable condition for use as a jointing substance by treating the composition with a suitable organic solvent to convert it to a jelly and then dissolving the jelly in a second organic solvent to form a solution or dispersion which is readily capable of being applied to the joint by means of a brush. For convenience, in describing the above conversions in detail, the composition obtained by the heating of the sulphur and the fatty oil will be referred to as a "base," the solution or dispersion applied to the surfaces to be joined together will be referred to as the "jointing substance," and the material obtained by evaporation of the organic solvents from the jointing substance will be referred to as the "jointing medium." The latter possesses the same properties as the base with the additional property of being very sticky or tacky. Thus, if two metal plates are coated with the substance and the solvent allowed to evaporate, and the plates pressed together and then pulled apart, the medium elongates to numerous threads, showing that it possesses the properties of flowability and adhesion, which it is considered necessary for a jointing medium to possess if it is to function satisfactorily as a sealing medium.

The base, prepared as described, melts at 195° C. but does not harden when heated for long periods at temperatures below its melting point and it is entirely resistant to the action of lubricating oil and fuel.

The action of various organic solvents towards the base is as follows:

| Solvent | Behaviour of Base |
|---|---|
| Methylated Spirit | Insoluble. |
| Trichlorethylene | Do. |
| Carbon Tetrachloride | Do. |
| Methyl Acetate | Do. |
| Ethyl Acetate | Do. |
| Butyl Acetate | Do. |
| Amyl Acetate | Do. |
| Acetone | Do. |
| Benzene | Do. |
| Toluene | Soluble. |
| Xylene | Do. |
| Solvent Naphtha | Do. |

The word "insoluble" is here used in a broad sense, inasmuch as it covers those instances where the product is only partially or slightly soluble in the solvent in addition to the instances where it is entirely insoluble. The word "soluble" is used to cover an action which may be the forming of a true molecular solution, a colloidal solution or a colloidal dispersion.

Although the base is capable of being dissolved in toluene, xylene and solvent naphtha these solvents are not sufficiently volatile to ensure rapid drying of the compound when applied to the joint face. However, it has been found that if the base be first mixed with one of these three solvents in sufficient quantity it will form a jelly which is soluble in many of the solvents in which the base alone is insoluble. For example, when 132 parts by weight of the base are added to 100 parts by weight of toluene and the resultant mix boiled under reflux a homogeneous solution is obtained in about 12 hours. Upon cooling the solution sets to a soft jelly. A suitable laboratory apparatus for boiling the base-toluene mixture under reflux is diagrammatically shown in Figure 1 of the accompanying drawing. The apparatus comprises a double-wall condenser 3, a flask 4 to receive the mixture and a source of heat (such as the gas burner 5) for the flask 4. A stream of coolant enters and leaves the condenser 3 by conduits 6.

The action on various organic solvents towards the jelly is as follows:

| Solvent | Behaviour of Jelly |
|---|---|
| Methylated Spirit | Insoluble. |
| Trichlorethylene | Soluble. |
| Carbon Tetrachloride | Do. |
| Methyl Acetate | Do. |
| Ethyl Acetate | Do. |
| Butyl Acetate | Do. |
| Amyl Acetate | Do. |
| Acetone | Do. |
| Benzene | Do. |

It is clear from the above table that there is considerable latitude in the choice of a solvent which may be used for thinning the jelly to the required consistency for application to the joint face.

It is preferred however, when the solution is intended as a jointing substance for use with internal-combustion engines, to use as a thinner carbon tetrachloride or acetone as in the following examples.

*Example I*

When the solution is intended as a jointing substance for extremely good joints where only a "flash" of jointing compound is required on the surfaces with little or no beading at the edges of the joint, it has been found most convenient that it be prepared from 100 parts by weight of jelly and 100 parts by weight of carbon tetrachloride. Such a solution may be used in tropical climates.

*Example II*

When the solution is intended as a jointing substance for the average type of commercial joint where a fairly thick layer of jointing compound is required on the surfaces, it has been found most convenient that it be prepared from 100 parts by weight of jelly and 15 parts by weight of acetone. Such a mixture may be regarded as a general-all-around-purpose solution suitable for use in temperate climates.

*Example III*

When the solution is intended as a general-all-around-purpose jointing substance for application to the average type of commercial joint in tropical climates, it has been found most convenient that it be prepared from 100 parts by weight of jelly and 40 parts by weight of carbon tetrachloride. Such a solution possesses approximately the same consistency and drying rate in tropical climates as that of the above-mentioned acetone-thinned solution in temperate climates.

When the above solutions are applied to a joint face, the thinners and toluene evaporate and leave the jointing medium.

The solution which is applied to the joint face and the vapours arising from it during drying thereon are non-inflammable when carbon tetrachloride is the thinner, since although toluene is inflammable, the quantity of carbon tetrachloride which is present in the solution is sufficient to render the mixture as a whole non-inflammable.

When acetone is employed as the thinner, the solution and the vapours arising from it are inflammable.

Although in the above description reference is made to the jelly obtained upon cooling the solution of the base in toluene, it is to be understood that there is no necessity for cooling this solution prior to the addition of thinner. Thus, the thinners may be added to the solution while it is hot and still in the liquid state.

From the foregoing it will be clear that a preferred jointing substance is obtained from a base prepared by heating sulphur with castor oil, the base being subsequently heated with toluene to form a jelly which is diluted with carbon tetrachloride or acetone to produce a substance readily capable of application to the joint faces by a brush.

Although in the description above reference is only made to castor oil it is to be understood that other fatty oils may be combined with sulphur to give similar rubber-like elastic compositions the properties of each of which depends to a considerable extent upon the oil which is used.

Solutions prepared by the above method were found to be satisfactory as joint sealing media, but the stronger solutions possessed a tendency to turn gelatinous during storage after a period which varied from 2-6 weeks, and in this condition they could not be applied so readily to the surfaces to be joined. This drawback was not noticed with the weak solution, i. e. that having 100 parts by weight of jelly in 100 parts by weight of carbon tetrachloride, samples of which were found to be quite stable at the end of four months' storage.

In an attempt to overcome the tendency of the stronger solutions to "gel," and at the same time to find a more rapid method for dissolving the castor oil-sulphur product in toluene, it was found possible to add the cold toluene to the molten castor oil-sulphur product while the latter was at 226° C. immediately the 2 to 5 minutes heating at this temperature was completed.

Since toluene boils at 110° C. under normal atmospheric pressure, it was necessary to adopt a suitable technique in carrying out the process. This constitutes, in principle, the basis of the present laboratory and commercial methods which have been established for the manufacture of the three jointing compounds described above.

It is found that the solutions of Examples I, II and III when prepared by the following method possess somewhat different viscosities from those obtained by the above described method. The desired viscosities are therefore maintained by using the proportions of toluene and thinners as follows.

|  | Example I | Example II | Example III |
|---|---|---|---|
| Castor Oil-sulphur base | 150 | 150 | 150 |
| Toluene | 100 | 100 | 100 |
| Carbon Tetrachloride | 250 |  | 100 |
| Acetone |  | 37.5 |  |

Figure 2:
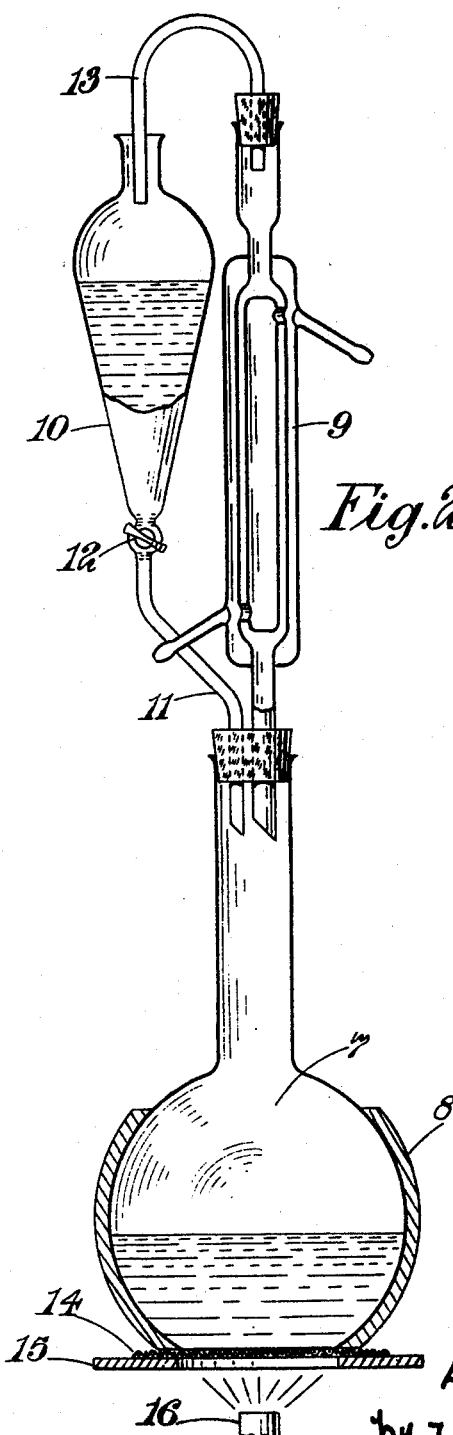

A suitable laboratory apparatus by which the cold toluene may be added to the molten castor oil-sulphur product is diagrammatically shown in Figure 2 of the accompanying drawing. Referring to this figure the apparatus is shown as comprising a flat-bottomed flask 7 the side wall of which is lagged with asbestos or other heat insulating material as at 8. Connected with the flask is a double-wall condenser 9 and a funnel 10, the latter being in communication with the flask by a pipe 11 incorporating a tap 12. The funnel 10 and condenser 9 are connected together by a pipe 13 and as is clear from Figure 2 the pipe 13 is a close fit into the upper part of the condenser 9 whilst the other end passes into and just below the neck of the funnel 10. The latter is open to atmosphere.

The assembly described rests upon a piece of wire-gauze 14 which covers a circular hole in the center of an asbestos sheet 15. The latter is suitably supported above a gas burner 16 and the arrangement is that the diameter of the hole in sheet 15 is slightly larger than the diameter of the flat-bottom of the flask 7.

With the apparatus described the following procedure is adopted: The castor oil is introduced to the flask 7 (the condenser 9 and funnel 10 having previously been removed) and the gas burner 16 is lit so that the temperature of the oil is raised to 190° C. Thereafter the sulphur is introduced and this causes the temperature to fall to about 170° C. Thereafter the mixture is heated slowly at the rate of approximately 2° C. per minute with constant gentle agitation until a temperature of 226° C. is reached. This temperature is then maintained for a duration of 3 to 5 minutes at the end of which time the condenser and funnel assembly is connected to the flask 7 and the toluene which has previously been introduced into the funnel 10 is run on to the hot mass within the flask 7 as quickly as possible by fully opening the tap 12. The toluene, immediately it reaches the molten mass within the flask, vaporizes rapidly and condenses in the condenser 9, but the small increase in pressure developed in the flask 7 as a consequence forces the condensate in the condenser through the pipe 13 and into the funnel 10 from whence it descends into the flask 7. This cycle repeats itself rapidly until ultimately after about 30 seconds all the toluene from the funnel 10 is in the flask 7 whereupon the tap 12 is closed.

With the procedure described the castor oil-sulphur product dissolves almost instantaneously in the toluene and it is believed that this is largely due to the small time interval during which the toluene is initially in contact with the hot mass in the flask 7 before vaporization begins.

Having introduced the toluene to the flask as described the mixture is next boiled for a period of 30 minutes and then after being allowed to cool to approximately 50° C. the required amount of thinner is added to the mixture within the flask 7 from the funnel 10. It will be appreciated that this thinner has previously been introduced to the funnel 10 whilst the tap 12 remains closed. After the thinner has been introduced to the flask 7 the mixture is boiled for a further period of 30 minutes and at the end of this time it is allowed to cool to room temperature whereupon it is transferred to suitable storage vessels which should be well sealed.

It is to be noted that the castor oil may be heated as quickly as possible to 190° C. prior to the introduction of sulphur but that once this addition has been made it is important that the mixture be heated at a controlled rate. Heating from 170° C. to 220° C. over a period of 20 to 25 minutes has generally been found satisfactory. If the mixture be heated too quickly at this stage, there is a tendency for it to froth copiously with loss of sulphur the resulting compound then produced being found unsatisfactory. It is important for the same reason that the mixture be heated at 226° C. for not longer than 5 minutes.

It has been found that the rate of heating after the addition of sulphur, and the duration of heating at 226° C. becomes of less importance when larger quantities of the compound are being prepared. The times quoted are to be understood therefore as applying to the specific apparatus shown in Figure 2 in which the flask 7 has a capacity of 3 litres and the funnel 10 a capacity of 500 ccs.

The purpose of lagging the flask 7 as at 8 is to prevent the formation of a thin layer of undissolved castor oil-sulphur product which would otherwise solidify to the side of the flask during the addition of the toluene.

It will be appreciated, of course, that a plant based upon the principles of production described with reference to Figure 2 may be designed for industrial manufacture of the compound.

A jointing compound prepared as above described has been found to be effective for sealing leaks in petrol tanks, protecting rubber cables against fuel and oil, sticking rubber to glass and glass to metal. It is believed that compositions prepared in accordance with the present invention are capable of many other uses in addition to producing leak-proof joints without the use of packing materials.

I claim:

1. A process for the preparation of jointing composition, which process comprises adding sulphur to a fatty oil, the sulphur comprising between 10% and 43% by weight of the mixture, heating the mixture at a temperature between 220° C. and 240° C., maintaining the temperature for from 2 to 5 minutes to produce a vulcanized base, dissolving or dispersing the base in a volatile, organic solvent chosen from the group consisting of toluene, xylene and solvent naphtha and dissolving the resultant mass in benzene for thinning the same to the desired consistency for the jointing composition.

2. A process for the preparation of a jointing composition, which process comprises adding approximately 20 parts by weight of sulphur to 100 parts by weight of fatty oil, heating the mixture at a temperature in excess of 220° C. and raising the same to 226° C., maintaining said last mentioned temperature for from 2 to 5 minutes, dissolving or dispersing the base in a volatile, organic solvent chosen from the group consisting of toluene, xylene, and solvent naphtha and dissolving the resultant mass in benzene for thinning the same to the desired consistency for the jointing composition.

3. A process for the preparation of a jointing composition, which process comprises heating 100 parts by weight of castor oil to 190° C. adding 20 parts by weight of flowers of sulphur thereto with continuous stirring, raising the temperature of the mixture to 226° C. over a period of 20 to 30 minutes, maintaining the mixture at 226° C. for 2 to 5 minutes, dissolving or dispersing the base thus formed in a volatile, organic solvent chosen from the group consisting of toluene, xylene and solvent naphtha and dissolving the resultant mass in benzene for thinning the same to the desired consistency for the jointing composition.

4. A process for the preparation of a jointing composition, which process comprises heating 100 parts by weight of castor oil to 190° C. adding 20 parts by weight of flowers of sulphur thereto with continuous stirring, raising the temperature of the mixture to 226° C. over a period of 20 to 30 minutes, maintaining the mixture at 226° C. for 2 to 5 minutes while agitating the same to produce a vulcanized base and allowing the vulcanized base to cool, adding 132 parts by weight of the base to 100 parts of an organic solvent chosen from the group consisting of toluene, xylene and solvent naphtha and boiling under reflux for 12 hours to form a jelly and upon subsequent cooling, diluting 100 parts by weight of the jelly with between 15 to 100 parts by weight of benzene for thinning the same to the desired consistency for the jointing composition.

ALAN THOMAS BARRINGTON
PARKHURST SQUIRES.

No references cited.